United States Patent [19]

Carr et al.

[11] Patent Number: 4,964,804
[45] Date of Patent: Oct. 23, 1990

[54] TRAINING KIT

[75] Inventors: Thomas G. Carr, Falmer; Donald Oliver, Ortington; John James, Brighton; Robert Rayfield, Kingswood, all of England

[73] Assignee: Otis Elevator Company, Farmington, Conn.

[21] Appl. No.: 337,010

[22] Filed: Apr. 12, 1989

[30] Foreign Application Priority Data

Apr. 11, 1989 [GB] United Kingdom ............ 8808446

[51] Int. Cl.⁵ .................................................. G09B 9/00
[52] U.S. Cl. ........................................ 434/219; 434/366
[58] Field of Search ............... 434/219, 224, 365, 366

[56] References Cited

U.S. PATENT DOCUMENTS 3,832,790  9/1974  Fryer, Jr. et al. ............... 434/224
4,167,821  9/1979  Gibson, Jr. et al. ............. 434/219
4,316,720  2/1982  Ackerman ....................... 434/224
4,623,312  11/1986  Crawford ....................... 434/224
4,776,798  10/1988  Crawford ....................... 434/224

FOREIGN PATENT DOCUMENTS 1542910  3/1979  United Kingdom .
2127645  4/1984  United Kingdom .
2143361  2/1985  United Kingdom .

Primary Examiner—William H. Grieb
Attorney, Agent, or Firm—Francis J. Maguire, Jr.

[57] ABSTRACT

A training or servicing kit comprises a portable electronic simulation of an apparatus, the simulation including manually operable means to sense and/or control parameters of the simulation, and a computer with associated software serving in use to lead an operator through a training or servicing programme in dependence upon the values of parameters determined by the operator by means of the manually operable means.

3 Claims, 10 Drawing Sheets

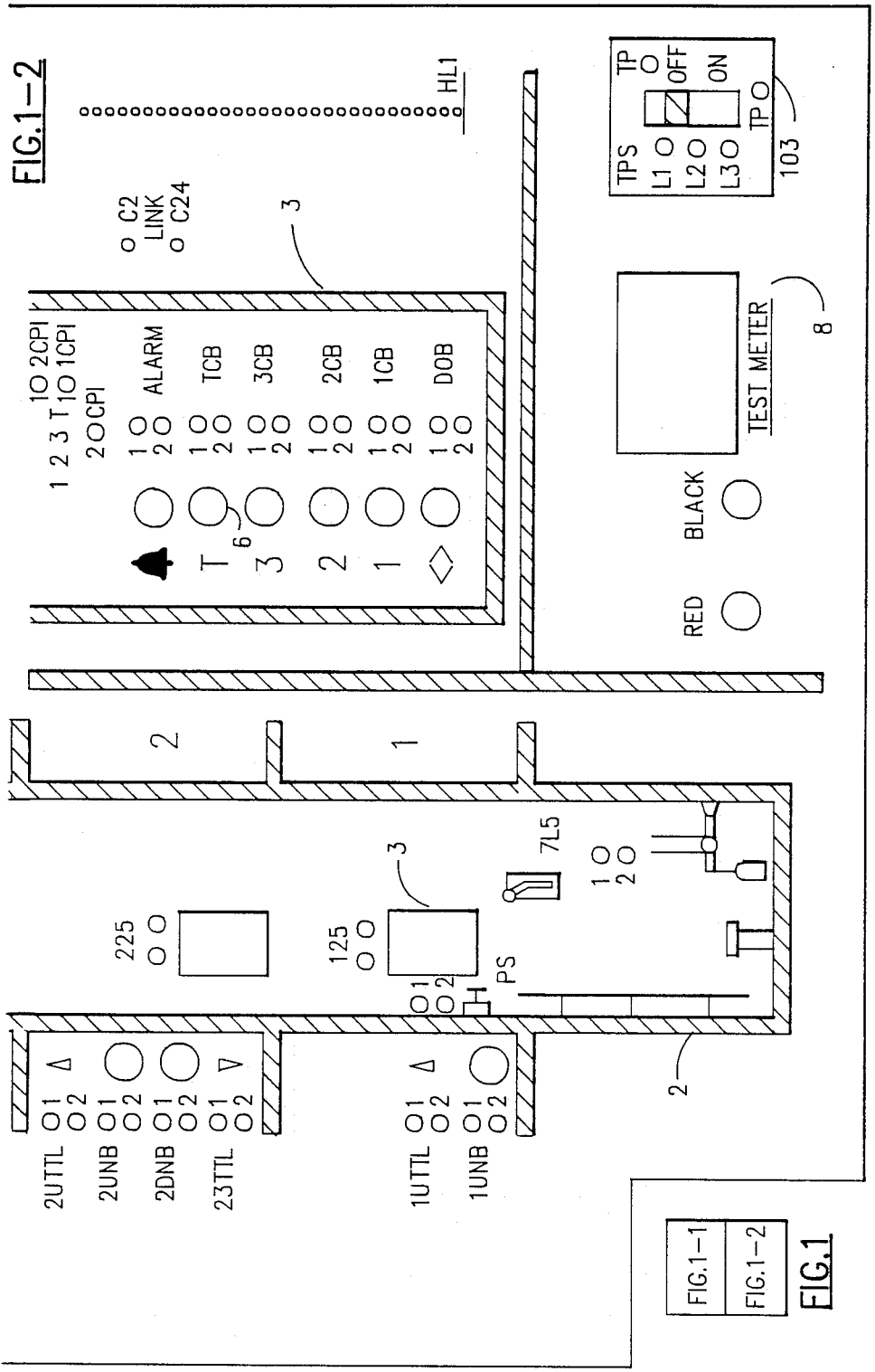

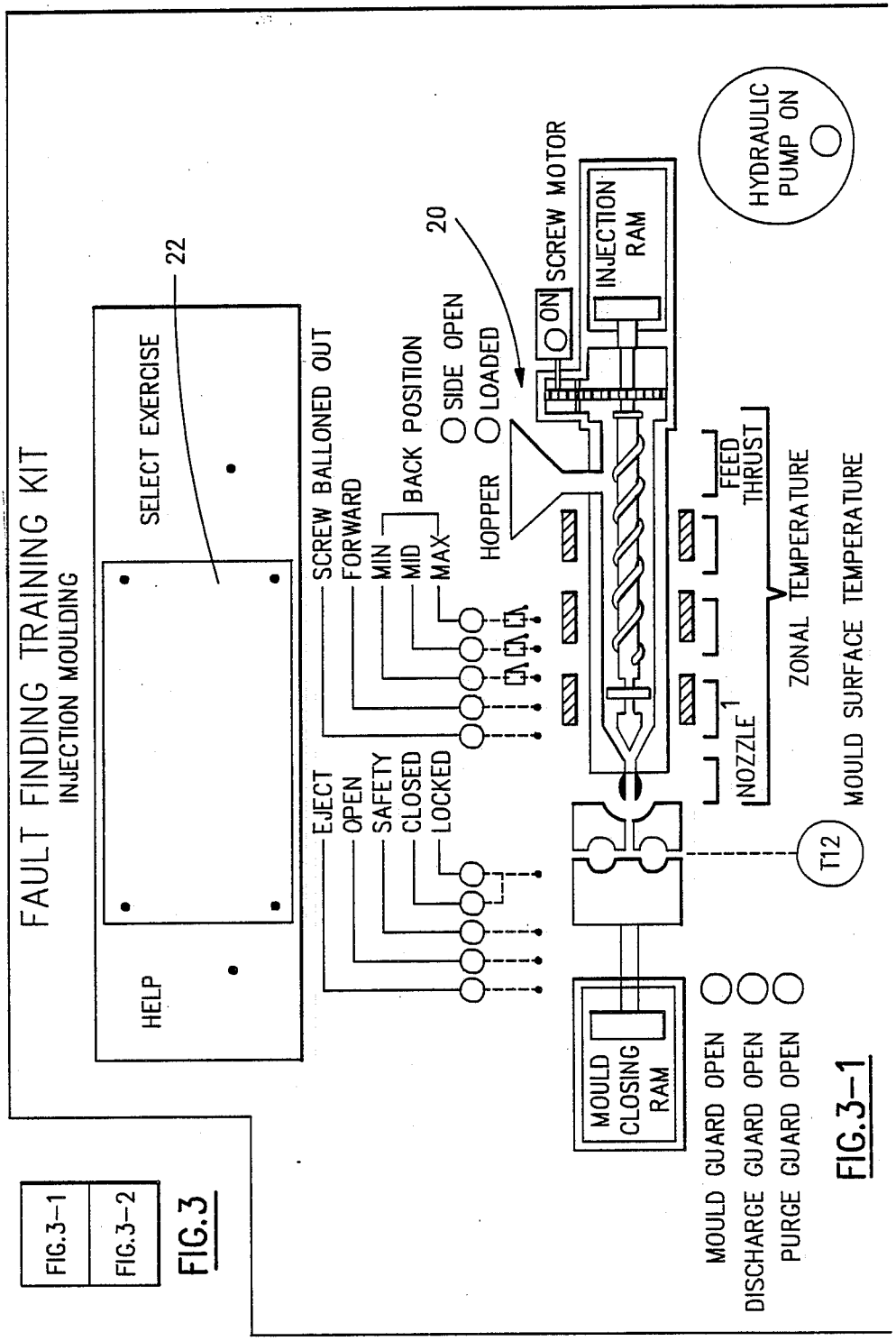

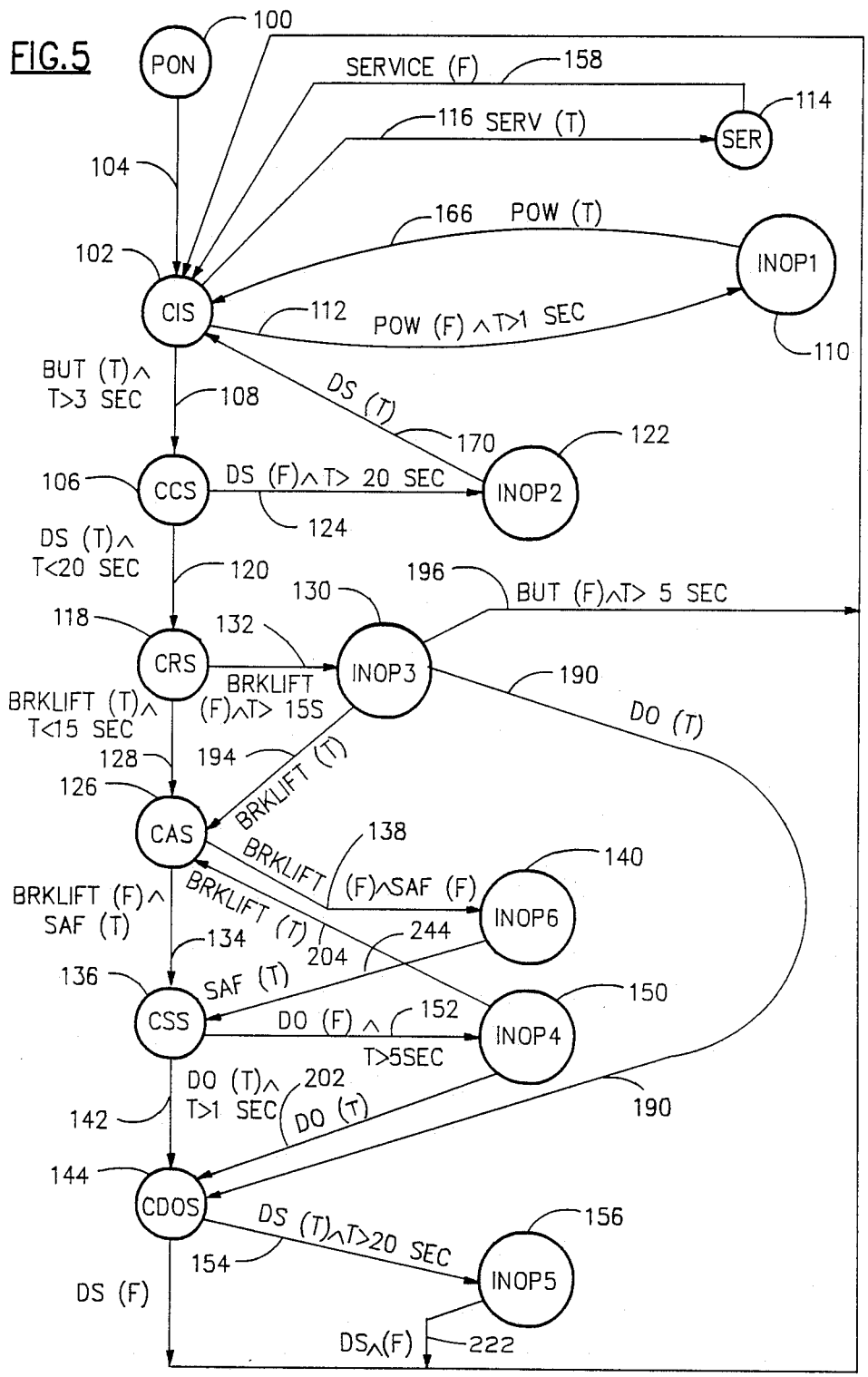

TRAINING KIT

TECHNICAL FIELD

This invention relates to a training kit and, in particular, to a simulator for use by maintenance or service personnel in learning how to detect faults in electrical systems.

BACKGROUND ART

Industrial equipment manufacturers are introducing increasingly complex electronic control equipment which of course needs to be serviced. Unfortunately, industrial innovation often proceeds at such a rapid pace that maintenance personnel are hard put to keep up. A common approach has been for companies to provide a lengthy period of "on-the-job-training." Though experience is one of the more effective training methods, such long apprenticeships can often be shortened by using simulators to impart much of such knowledge in a shorter period of time in a classroom environment. For example, in the lift industry, complex electromechanical lift simulators have been developed by various lift manufacturers to train their maintenance personnel. Similar simulators have been developed by companies, for example, in the injection molding business, aircraft business, etc. The applications for such simulators are of course very wide. See for example U.S. Pat. No. 3,832,790, U.K. Patent No. 1 542 910, and U.K. Patent Applications GB No. 2 127 645 A and 2 143 361 A.

Many companies have found that such training, though useful in reducing the period of on-the-job-training, is necessarily limited in time, and may be more or less effective depending on the ability of the individual students to absorb large amounts of information in a such a short period of time.

In addition, such companies have found that many of their employees, though willing and eager to become expert in newly introduced and highly sophisticated electronic equipment, are unable to satisfy their needs even in the field over a long period, due to their lacking basic electrical troubleshooting skills.

DISCLOSURE OF THE INVENTION

It is an object of the present invention to provide a training kit which may be used by a student in a home study context.

According to the present invention, there is provided a training kit comprising a portable electronic simulation of an apparatus, the simulation including manually operable means to control parameters of the simulation and a signal processor with associated software serving to lead an operator through a training or servicing program in dependence upon the values of parameters determined by the operator by means of manually operable means.

The kit of this invention offers a relatively inexpensive method of training machine operators, setters and service engineers. The method permits trainees to study at their own pace and does not require a space model of any type, but which relies upon a portable, completely electronic simulation of an apparatus. With electronics it is possible to provide a simulation of the function and operation of almost any apparatus, and the kit of the invention makes use of such a simulation together with a microprocessor and associated software. Probes can be connected to the microprocessor and used to monitor machine states and conditions to provide information as a training or servicing aid at relative low cost and with ease of use. Expert information or models can also be included in the software and arranged to output information to trainees to prompt or support the training process.

These and other objects, features and advantages of the present invention will become more apparent in light of the detailed description of a best mode embodiment thereof, as illustrated in the accompanying drawing.

BRIEF DESCRIPTION OF THE DRAWING

FIG. 5 shows a state machine which may be useful in controlling a simulator such as shown in FIG. 1, 2 and 4.

BEST MODE FOR CARRYING OUT THE INVENTION

Figure 1:
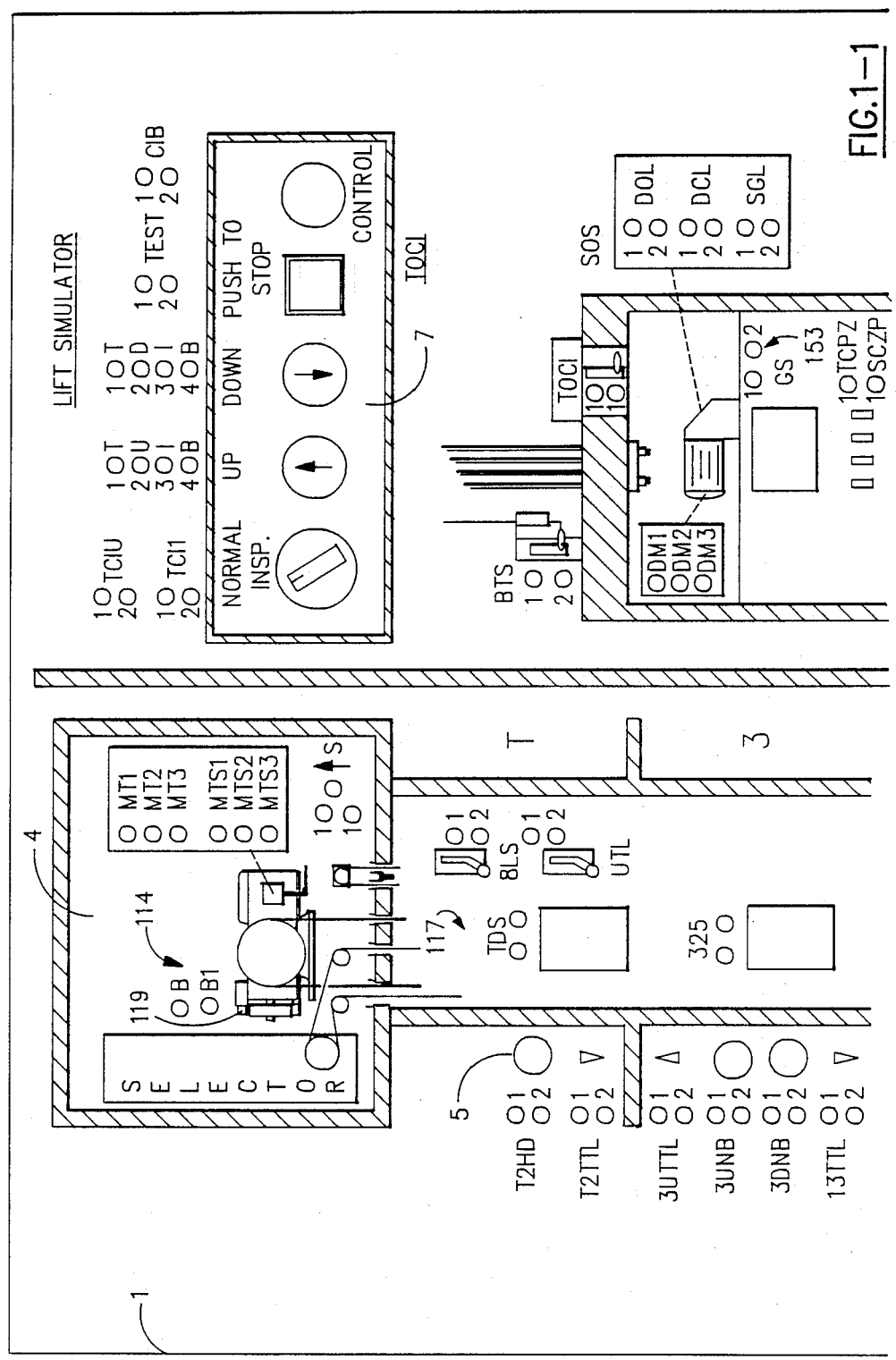
FIG. 1 shows the front face of a part of an electronic simulation of a lift apparatus.
Figures 1, 2:
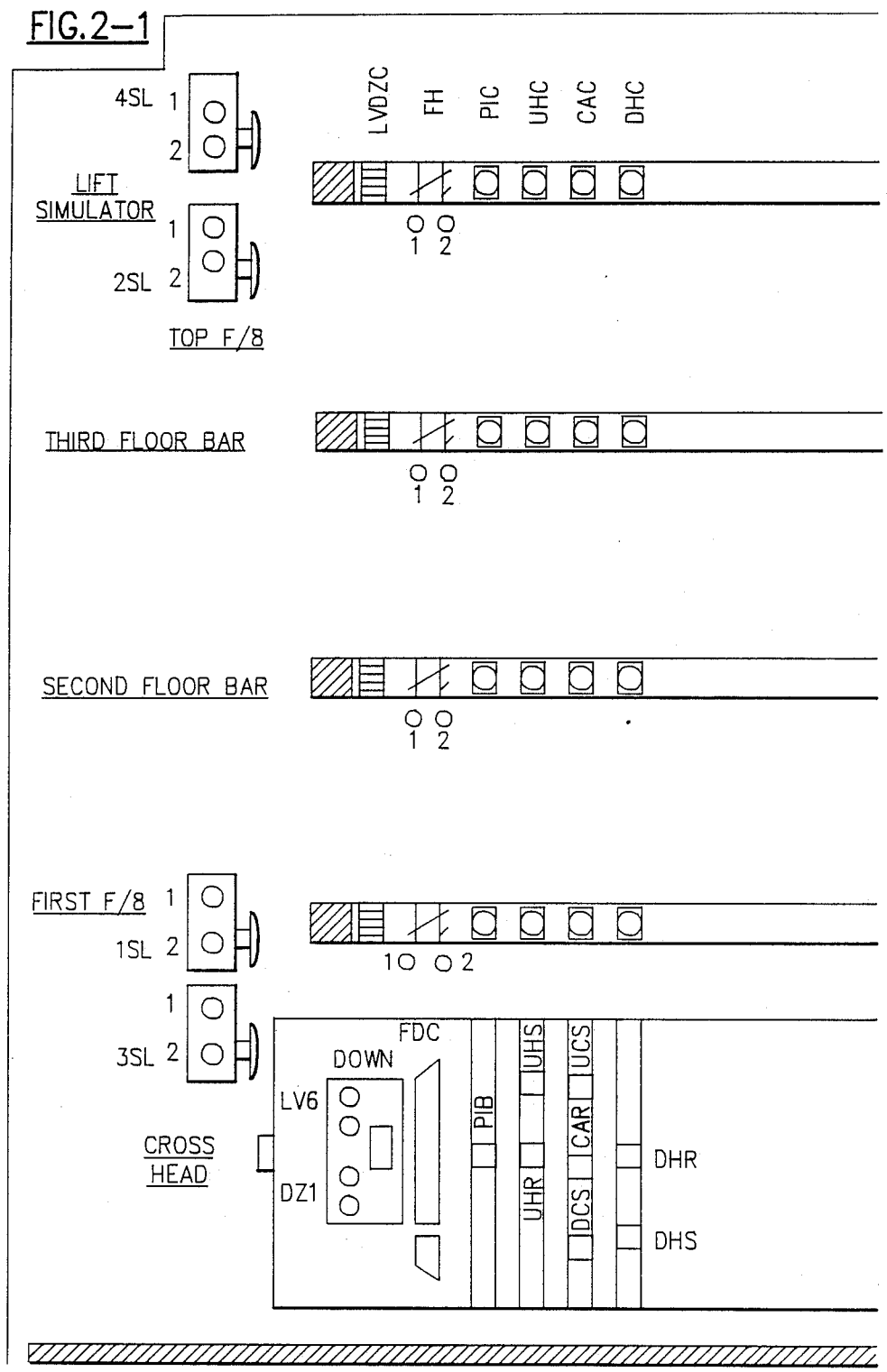
FIG. 2 shows the remainder of the front face of the simulation of FIG. 1.
Figure 2:
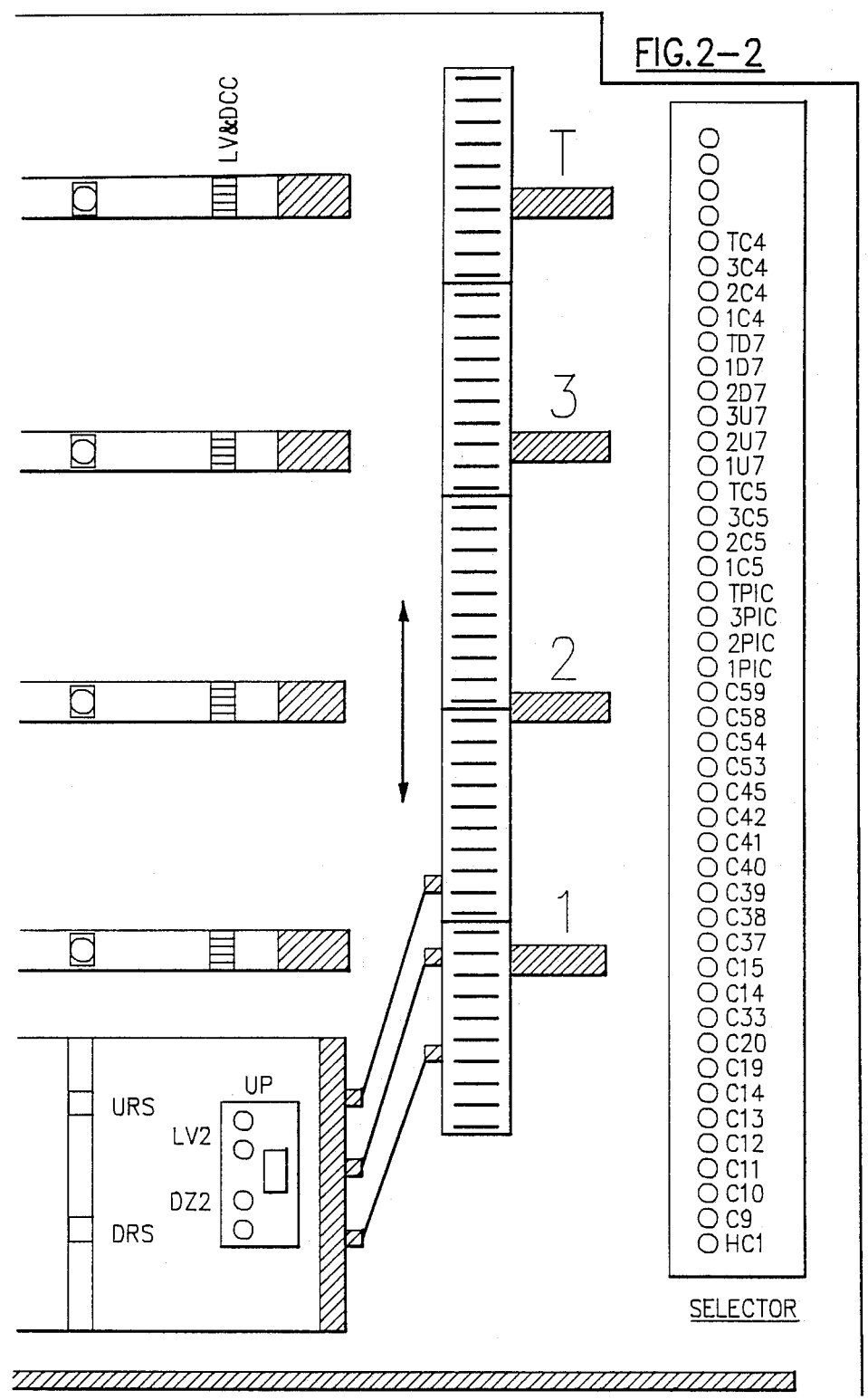

As shown in FIG. IA, FIGS. 1 and 2 together show the front face of a portable, completely electronic simulation of a lift apparatus, the simulation comprising electronic components mounted on a surface such as a printed circuit board or boards, the simulation being of a size that enables it to be carried by a user between locations of use, for example home, work or college. The circuitry of the simulation accurately reproduces that of a simulated lift apparatus, and will be described in detail in connection with FIGS. 4 and 5 hereinafter.

FIG. 1 shows on the left a section 1 representing a lift shaft 2 and a car 3 therein, with winding gear 4 at the top of the shaft 2 and control buttons 5 at each of four floors between which the lift operates. On the right, FIG. 1 shows one of the cars 3 with its internal control buttons 6 and a set of controls 7 useable by a service engineer or the like. Also shown is a test meter 8 having a pair of connection points for manually operable means in the form of a probe or probes 46, 48 (not shown in FIG. 1, but see FIG. 4) by which connections can be established between particular test points on the simulator and the processor within, thereby to effect required sensing or preferably simulated sensing of the operating parameters of the simulation.

FIG. 2 shows simulated transformers and rectifiers which would be used to provide power to the control circuits of a lift. Relays 10 simulate typical control relays used to control the operation of a lift apparatus in response to operation of the simulated lift control buttons shown in FIG. 1. All of the voltages or resistances of these various components and relays may be simulated according to the simulated state to be described subsequently.

Figures 2, 3, 4:
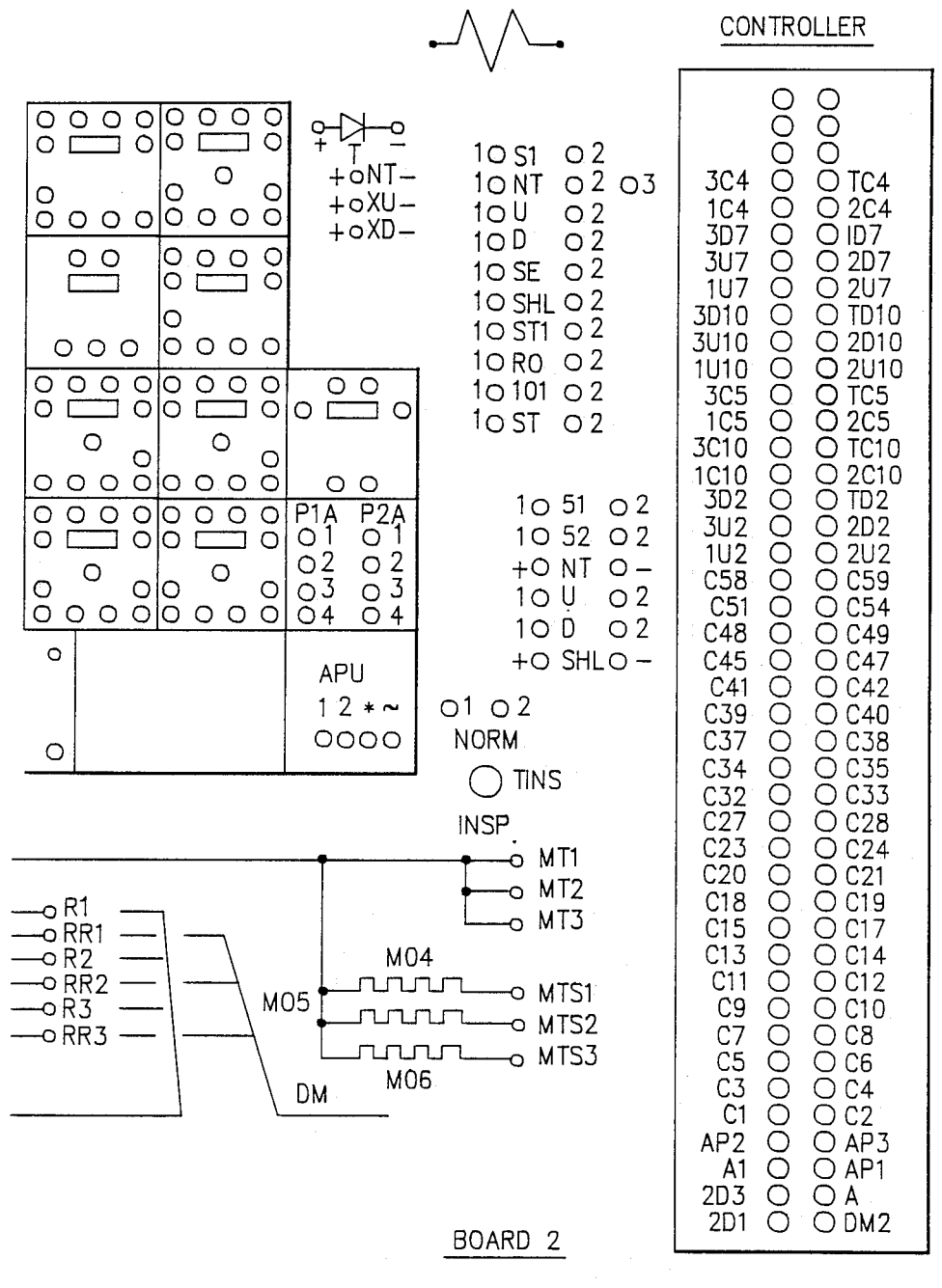
FIG. 4 shows various components associated in a training kit such as for FIGS. 1 & 2 or FIG. 3, according to the present invention.
Figures 2, 3:
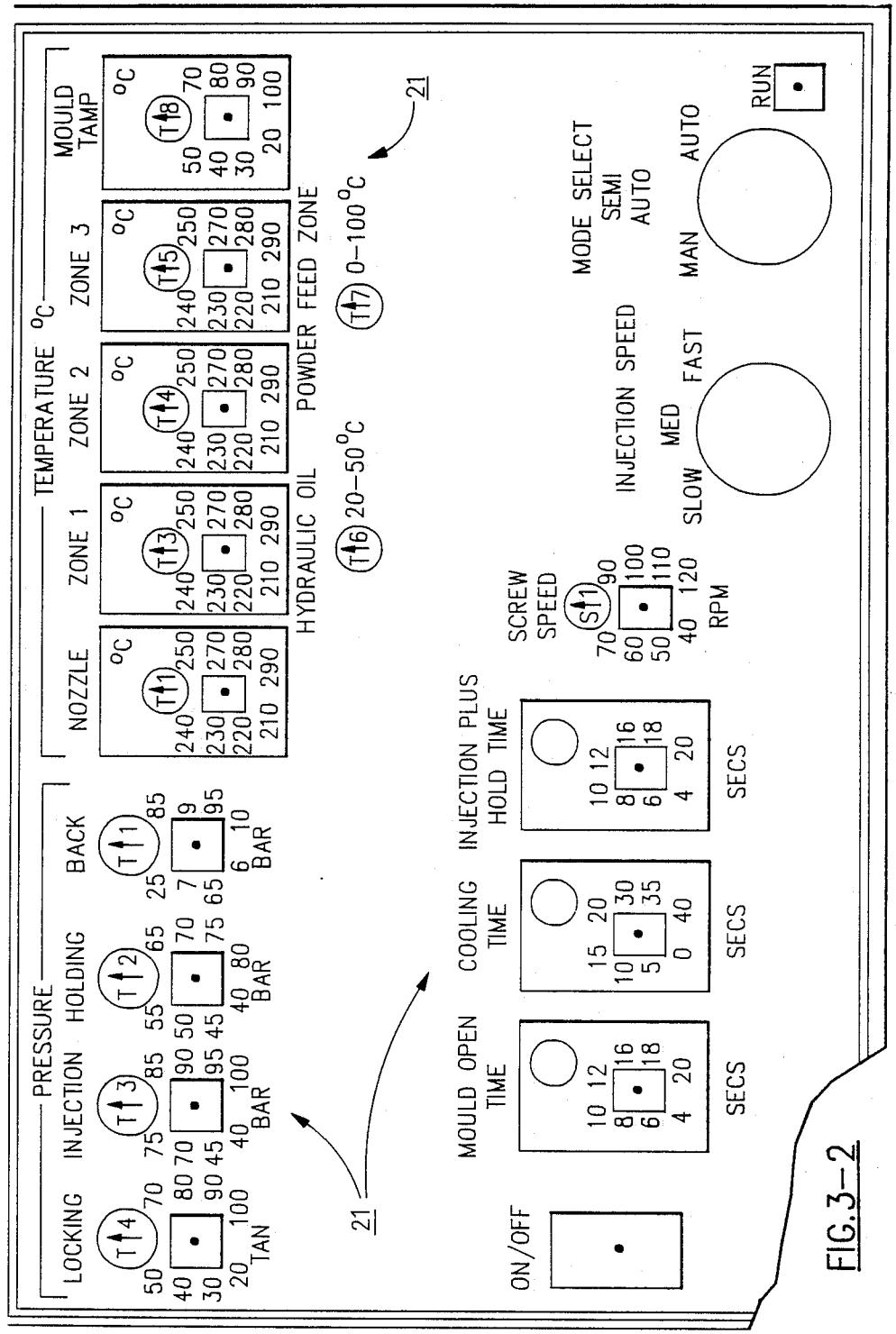
Figure 4:
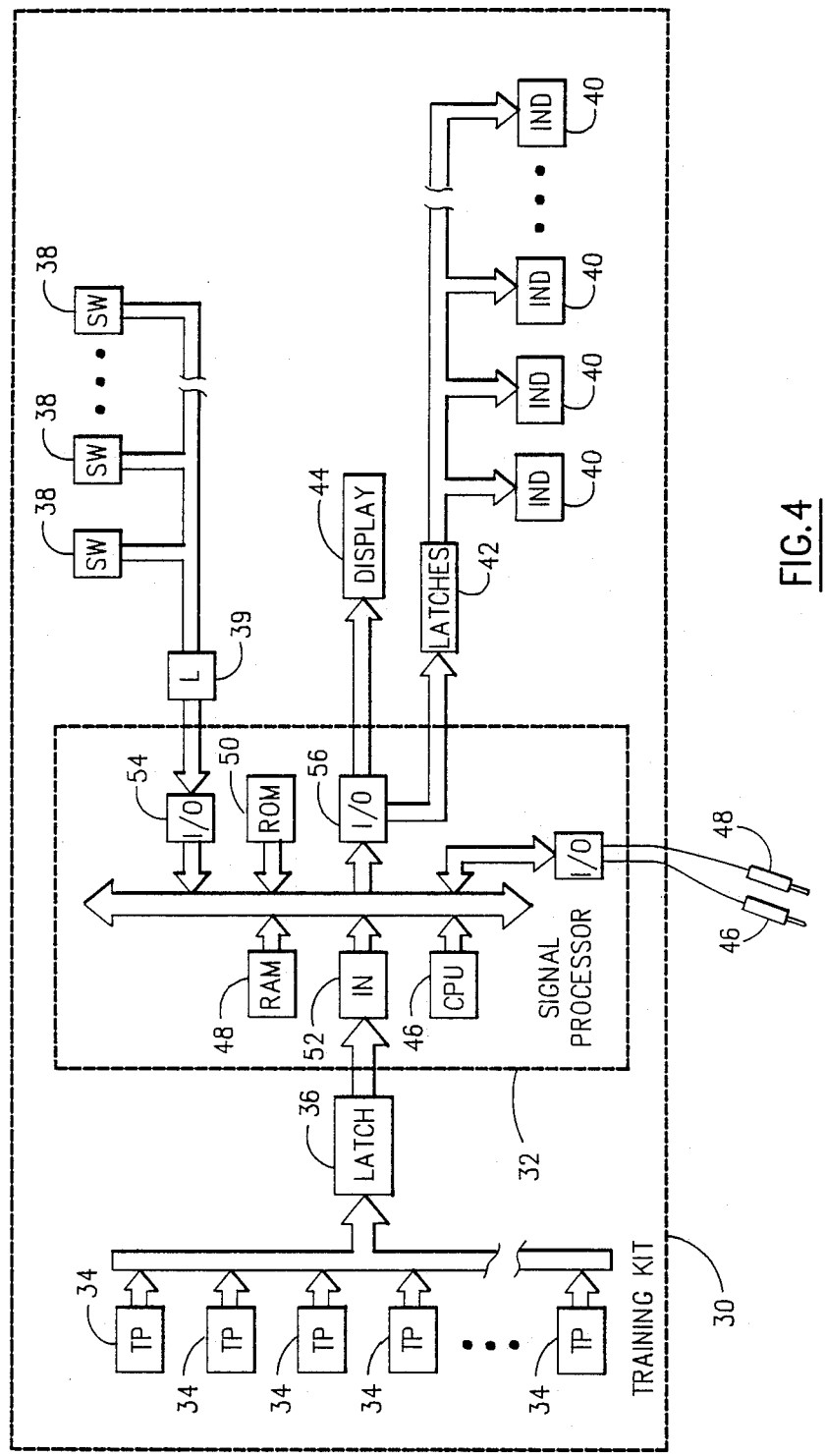

The simulator of FIGS. 1 and 2 is comprised of hardware, some of which is shown in FIG. 4, which includes a signal processor and various other components to be described below for leading an operator through a training and/or servicing schedule requiring the operator to respond by using the probe or probes to establish connections and sense voltages, etc., between contact or test points on the simulator, thereby to ascertain the nature of simulated faults in the lift apparatus and to effect their cure.

The kit can include written material serving to guide and assist the operator or student in using the kit.

As mentioned, the simulation can include a visual display on its front face, serving to display information relating to the operating of the simulated lift apparatus and/or information resulting from use of the probe or probes by an operator.

Figures 1A, 2, 3:
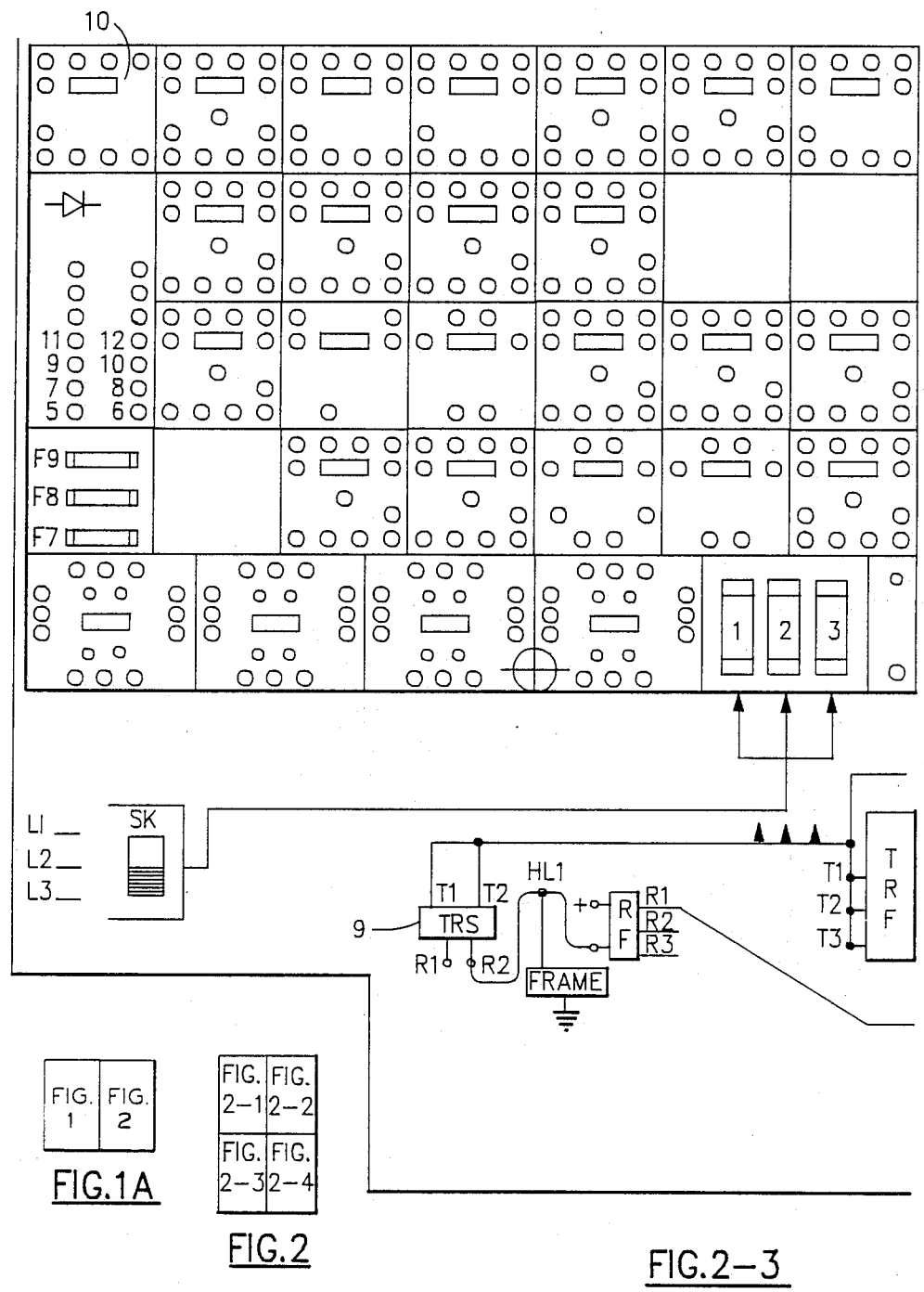
FIG. 1A shows the relationship between FIGS. 1 & 2.
FIG. 3 shows the front face of an electronic simulation of an injection molding apparatus.

Referring now to FIG. 3, this shows the front face of a portable, completely electronic simulation of an injection molding apparatus, the simulation again comprising electronic components carried by printed circuit boards, and showing a mimic diagram 20 of the injection molding apparatus. Mounted on the front face of the simulation are manually operable means in the form of knobs 21 by the use of which an operator can set control parameters which determine the quality and acceptability of the simulated final product output by the machine (described by statements provided on the liquid crystal display 22). The display can also provide information relating to the sequence of operation of the apparatus, or the value of parameters set by knobs 21 when adjusted by the operator. With a test probe connected to the signal processor, machine conditions, at various stages in the operating sequence, can be monitored and displayed.

As with the kit of FIGS. 1 and 2, this simulator may preferably be driven by a microprocessor (not shown) with associated software which leaves an operator through a training and/or-servicing schedule.

Referring now to FIG. 4, a simplified block diagram of some components which may be used in making a simulator, training or servicing kit, according to the present invention, is illustrated. The training kit shown in FIG. 4 would be used to form the basis of the simulator in FIGS. 1 & 2 or the simulator of FIG. 3 or for any other simulator made according to the principles taught herein.

The training kit 30 may be made of a printed circuit board having a signal processor such as a microprocessor mounted thereon but which, as mentioned, may comprise discrete components for carrying out the same functionality, a plurality of test points 34 which may be interfaced to the signal processor 32 by means of, for example but not limited to, a plurality of latches 36, a plurality of switches 38 which may similarly interface with the signal processor, again for example only, by means of latches 39 and a plurality of indicating lamps 40 which may interface with the signal processor 32 for example by means of a plurality of latches 42. The training kit 30 may optionally include a display 44 and/or a probe 46 or a pair of probes 46, 48 for testing and displaying the voltage or resistance across various test points 34 or similarly at test points 34 machine conditions such as temperature, pressure, speed, time, etc.

The signal processor 32 may comprise a central processing unit (CPU) 46, a random access memory (RAM) 48, a read only memory (ROM) 50 for storing a program and various input/output (I/0) ports 52, 54, 56 all interconnected by various data, address and control lines 57.

As mentioned, the simulators of FIGS. 1 and 2, and also of FIG. 3, may have "test meters" which are actually really displays built-in to the training kits. These displays utilize probes in the same way as illustrated in FIG. 4, as if they were volt-ohmmeters, so as to be able to "measure" voltage or continuity across or between various test points, or machine conditions such as temperature, pressure, speed, timing, etc., these being selected/monitored by the trainee as required. The preferred embodiment of FIG. 4 utilizes simulated voltages and resistances between test points, depending on circumstances simulated by the program resident in ROM 50. For example, suppose that one of the switches 38 is a simulated three-phase main power isolator switch which is thrown in the off position by the student so as to measure the resistance between two of the test points he has selected. In that case, the signal processor 32 will sense that the probes 46, 48 have been contacted with a particular two of the test points 34 and will be able to tell which test points are being interrogated by the probes through interrogation of the latches 36 in sequence. Upon determining which two test points are being interrogated by the probes, the signal processor will provide the necessary signal to the display 44 in order to display the correct resistance value for the circumstance determined by the program resident in ROM 50 and explained in further detail in connection with the state machine of FIG. 5. In the alternative, it will of course be within the skill of an engineer to make various circuitry for interfacing with the test points so as to produce actual voltages at the test points depending on the state of the system being simulated As mentioned, however,:this is not the preferred embodiment.

Referring now to FIG. 5, a state machine model of a lift system in which transitions from state-to-state following a typical sequence of lift operations, is shown. Because all lifts perform the same general functions, they contain similar rudimentary control and status points within their controller. Many of such points which have been illustrated in the simulation of FIGS. 1 and 2 will figure in the description of the state machine of FIG. 5. Many other points which have also been illustrated will not be described to reduce the complexity of this specification. It will be understood, however, that the general principles disclosed may be extended to cover all of the desired points which may play a role in a given simulation. With respect to the points described in detail, most lifts perform an equivalent sequence of operations when performing their normal functions. The state machine described herein, in connection with FIG. 5, when implemented in the signal processor 32 of FIG. 4 to interface with the test points 34, switches 38, display 44, indicators 40 and probes 48, thus in effect simulates the entire sequence of operations that a lift performs. If one or more of the switches 38 are used to signal the signal processor 32 that a certain selected fault is to be simulated, the simulation program resident in the signal processor's ROM will cause the "lift" to fail to follow the normal sequence or fail to meet the specified criteria for transitioning between successive normal states representative of normal operation. This is indicated to the student by illuminating a lamp or displaying a signal (or by failing to do so) indicative of certain conditions within the system that is indicative of a malfunction. An inoperative condition or failure condition must then be logically determined by the student with the aid of the probes 46, 48 and the display 44.

Each state that the simulated lift can assume is represented graphically in FIG. 5 by a circle. Mnemonics used within a circle identified the state. All transitions between states of the lift are represented graphically by arrows in between circles. Each transition is qualified by an expression whose value is either true or false. In the simulation, the lift transitions from one normal state to another in a normal controlled manner. It is assumed, for purposes of the simulation, that the expressions which qualify the transitions leading to the other states are satisfied for such normal transitions. An expression consists of one or more state linkages or minimum time limits used in conjunction with the operators: AND, OR, or NOT. Time is represented by the symbol T. This symbol achieves a true value only after the simulated lift has been in the state of a time value specified. It will remain true until after the state is exited.

In response to a transition to a -particular state, the signal processor will then make reference to a particular look-up table stored in ROM associated with that state which specifies the parameter values for the test points 34. These will of course change depending on the simulated state. In the real world, if such a state machine were used in a controller for controlling a real lift, any malfunction by the lift or lift controller which results in a failure to transition from a particular state in the normal sequence would be detected and instead of selecting a particular look-up table to enable the signal processor to simulate particular conditions, the state machine would indicate to a signal processor that a message should be sent to a local or central office for immediate service action. See for example U.S. Pat. Nos. 4,568,909; 4,622,538; or 4,750,591.

But, in a simulator, a simulated transition out of the normal sequence, according to the present invention, is identified by letting the signal processor select a given set of parameter values from a selected look-up table for providing the signal processor with appropriate information for indicating the proper voltage or resistance for the pair of test points 34 selected by the student with the probes 46, 48. Thus, in the real world such a state machine might be used for example in a monitoring role where an actual failure of the lift is a causal factor for a transition out of the normal sequence. In the present case, the causal factor for example, is generated by the signal processor itself as a simulated transition signal or may be generated, among other methods, by the throwing of a switch 38 by the student or instructor to simulate such a transition.

Definitions for the mnemonics for the states of FIG. 5 are as follows:

TABLE I

| State Description | Mnemonic |
|---|---|
| Power On State | PON |
| Car Idle State | CIS |
| Car Call State | CCS |
| Car Ready State | CRS |
| Car Active State | CAS |
| Car Stopped State | CSS |
| Car Door Open State | CDOS |
| Service State | SER |
| Inoperative State 1 | INOP1 |
| Inoperative State 2 | INOP2 |
| Inoperative State 3 | INOP3 |
| Inoperative State 4 | INOP4 |
| Inoperative State 5 | INOP5 |
| Inoperative State 6 | INOP6 |

Some of the data points utilized by the state machine of FIG. 5 are listed in Table II. These may or may not be simulated by test points 34. The eight data inputs that are listed are those normally associated with a single, automatic, push-button configuration of lift. It should be recognized that this is merely an example of a number of points selected for use by such a state machine and that this configuration merely represents a simple lift in operation today, i.e., a single shaft with a single hoist lift.

TABLE II

| Input Variable | Mnemonic |
|---|---|
| Safety Chain | SAF |
| Hall Call or Car Call Button | BUT |
| Hoistway Door Lock | DS |
| Elevator Brakelift | BRKLIFT |
| Door Open Actuator | DO |
| Occupied Alarm Bell | ALB |
| Maintenance Service | SERV |
| Elevator Power | POW |

In the diagram of the state machine, "true" refers to the affirmed condition of the data point in a logical sense only. The absence or presence of a voltage such as 120 VAC or 250 VDC from a test point is not relevant or even defined as, in this case, the test points may merely serve as points for identifying to the signal processor where the student happens to be placing the probes 46, 48. In such a case they would all be energized at the same low level DC, e.g., at 5 VDC. On the other hand, as mentioned, a simulator could simulate actual voltages and still remain within the scope of the present invention.

A detailed description of the operation of the state machine follows. Each state in the diagram of FIG. 5 will be described along with the requirements and conditions for transition out-of-the-state to another succeeding state. It should be understood that the actual hardware implementation illustrated in FIG. 4 for the state diagram of FIG. 5 requires a programmer to encode all of the requirements of the Figure in a particular language according to the particular hardware being used. However, the encoding details are not described because the particular hardware and programming techniques utilized are a matter of choice, not embracing the inventive concept Upon application of actual power to the simulator, a power-on state 100 will be entered after all self-test checking by the processor unit is completed. After entering the power-on state 100, the state machine will transition to a car idle state 102 as signified by a transitional line 104. It is assumed that when the simulator is powered up, the simulated lift car is running and in operation. Therefore, no abnormal states may be simulated from state 100. There is an implied entrance into the power-on state 100 any time actual power is applied or interrupted momentarily to the unit. Any time a processor reset occurs, the state machine will begin from the power-on state 100 as well.

The car idle state 102 functionally represents a car which has no demand and is waiting at a floor. By virtue of entering this state, the signal processor 32 of FIG. 4 will select from an appropriate look-up table corresponding to the CIS state, a number of values for various parameters which must be simulated if the student utilizes the test probes to interrogate particular test points for display purposes. Assuming that actual power is applied and the technician trainee has "energized" the "lift" by switching a switch 103 "ON," such a case implies that only voltages will be measured and all of the test points 34 can be considered by the trainee to be "energized" and therefore the signal processor will cause any of the points monitored by the probes 46, 48 to cause the display 44 to read out appropriate simulated voltages. In the opposite case, where switch 103 is in the "OFF" position, the signal processor will sense that fact and "assume" that subsequent interrogations of test points are for reading resistance and the display 44 will be provided with appropriate signals for indicating simulated values of ohms.

Any of the floors illustrated in Section 1 of FIG. 1 may be selected as the initial floor for indicating the initial position of the car. For example, floor 1 may be indicated by illuminating all of the LED matrix lamps in block 3, indicating that the car is idle at that floor and the doors are shut.

In order to exit the car idle state under normal operation, the student may press a button from the group of buttons 5 illustrated in FIG. 1 or from the group 6 illustrated in Section 3 of FIG. 1, thus simulating a button input from a "passenger" either at a hall landing or within a car. The signal processor will detect the button (one of the buttons 38) after it is depressed and will cause an associated lamp to become illuminated, either in a "hall landing" or in the "car" illustrated on the surface of the simulator 1. Upon the signal processor detecting a true condition of the button input for greater than three seconds, the state machine will sequence from car idle state 102 to a car called state 106, as signified by a transitional line 108.

On the other hand, an abnormal transition from the car idle state 102 can occur if the lift power goes false for greater than one second. In this case, the state machine will sequence from the car idle state 102 to an inoperative state 1 (INOP1) 110 as signified by a transitional line 112. A third transition condition out of the car idle state 102 occurs when service goes true indicating that maintenance is being performed on the lift car itself. This would be caused by, for example, the trainee pushing the "NORMAL INSP." switch in Section 7 of the lift simulator as shown in FIG. 1. This condition will cause the state machine to sequence from the car idle state 102 to an attendant state 114 as indicated by a transitional line 116. As mentioned, each of these states 110, 114 has an associated look-up table stored in the ROM 50 from which the signal processor 32 retrieves the appropriate parameter signals, in this case voltage values which the signal processor must obtain whenever the trainee touches a pair of test points 34 so that the signal processor may display the appropriate voltages on the display 44. In this case, a voltage is appropriate for display because the "lift" is "operational." If, after entering an inoperative state or service state, the trainee wishes to indicate that he is "deenergizing" the "lift" by switching switch 103 "OFF" for "troubleshooting" purposes, then the signal processor will display resistances instead.

The car called state 106 functionally represents a car which has been dispatched true [BUT(T)]by either a call from a hall or car button. The car is still indicated in the idle state by the LEDs at the floor but has not been activated by a signal to cause it to "move." Two transitions are possible from the car called state 106. A normal transition occurs when the hoistway door locks "make-up," i.e., the hoistway door lock variable is allowed to go true [DS(T)]within a time period of 20 seconds from the entrance into the car call state. The hoistway or landing lock contact test points 117 are shown in FIG. 1 above each of the hoistway doors 3 in Section 2. Upon this occurrence, the state machine will sequence from the car called state 106 to a car ready state 118. In the event that the hoistway lock variable does not go true but remains false for a period of time greater than 20 seconds from the entrance into the car called state 106, then an abnormal transition of the state machine will occur from the car called state 106 to an inoperative 2 (INOP2) state 122, as indicated by a transitional line 124. Such could be simulated by the instructor switching a fault simulating switch for signalling the processor 32 to simulate such a transition or by the student being directed to flip a certain switch prior to pushing a hall call or car call button to simulate this particular type of fault. Once in state 122, an associated look-up table is consulted by the signal processor for selecting the proper voltages or resistances for displaying the parameters with the appropriate values for this particular inoperative state.

The car ready state 118 functionally represents the condition that the car has been commanded to go, and the hoistway door locks have closed. There are two transitions possible from the car ready state. The normal transition is the occurrence of a brake lift on the lift car. Such would be indicated by a lamp 119 being extinguished as shown in FIG. 1 in Section 4, for example. This lifting of the brake must occur within 15 seconds after entering the car ready state 118. Upon the occurrence of brake lift within 15 seconds, the state machine will sequence from the car ready state 118 to a car active state 126 as indicated by a transitional line 128. In the event that the brake lift does not occur, for example by simulation of one of the switches 38 by the preprogrammed processor, instructor or student, within 15 seconds from entry into the car ready state, the state machine will sequence from the car ready state 118 to an inoperative 3 (INOP3) state 130 as indicated by a transitional line 132. This abnormal transition from the car ready state 118 would be accompanied by the signal processor accessing ROM 50 to obtain the proper values of parameters for this particular inoperative state for displaying the proper information in response to the student touching a pair of test points 34 with the probes 46, 48. Also provided by the processor are various signals to the car and hoistway areas in order to display simulated car and door movement.

The car active state 126 functionally represents the condition that the car is in motion. This may be represented in Section 2 of FIG. 1 by having the light emitting diodes (LEDs) gradually make their way one vertical line at a time, for example, upwards from landing 1 to landing 2. Thus, with all LEDs in the matrix 3 at the first landing illuminated at the outset, the bottom row of LEDs may be extinguished in the first landing box while at the same time the bottom row in the second landing box is illuminated, and so on, one row at a time, until all of the rows in landing 1 are extinguished and all of the rows in landing 2 box are illuminated. The car active state is the normal run mode for the lift car and is the predominant mode that a lift takes during a run. Upon approaching a terminal landing of a lift run, whether it be a single floor or a multi-floor run, at some point the car will begin to decelerate and stop at the desired landing for which the button signal generated the initial "go command" for the lift car. At the appropriate time, the control for the lift car will drop the brake for the car to stop it at the landing that has been determined to be correct for the initial "go" signal. The normal transition out of the car active state is thus the occurrence of this brake drop. It is signified by the variable "brake" going false as indicated by a transitional line 134 to a car stopped state 136. A safety chain input variable is included in the transitional expression in order to provide a check for a normal lift stopped condition. (The safety chain is a chain of series-connected normally closed safety related contacts the opening of any one or more of which constitutes a braking o f "the safety chain" and the assumption by the safety chain of a false value). Upon the occurrence of this, the state machine will sequence from the car active state 126 to the car stopped state 136. Note that the state machine assumes no time limit between going from the car active state 126 to the car stopped state, since it is not known how long the actual run will take. Nor it is of any importance to the state machine in monitoring the sequence of operations.

An abnormal transition from the car active state 126 can be simulated by switching an appropriate switch 38 indicative of a safety chain variable being abnormal along with the brake lift variable being abnormal along with the brake lift variable being false as indicated by a transitional line 138 to an inoperative 6 (INOP6) state 140. The transition line 138 indicates a stoppage of the lift car by the opening of the safety chain.

The car stopped state 136 functionally represents the condition that the brake has dropped on the lift and the car is now stopped. This is simulated by the signal processor sending out a signal to one of the latches 42 to cause one of the indicator lamps 40, specifically the lamp 119 shown in FIG. 1, to become illuminated indicating that the brake has dropped. If the student wishes to "deenergize" the "lift" he may flip the switch 103 to the "OFF" position in order to "test" the "continuity" of a lift brake lift contact 141 with the probes 46, 48. In that case, the signal processor would cause the display 44 to read out the appropriate open or closed circuit indication.

At this point it is not known whether the car has stopped at a floor or at some indeterminate point between the landings. It is the purpose of this state to detect which of these conditions is true. A normal transition from the car stopped state is the assumption by the door open variable of the true value within one second of entering the car stopped state 136. Upon the signal processor providing the door open variable with a true value within one second of entering the car stopped state 136, the state machine will sequence from the car stopped state 136 to the car door open state 144. An abnormal transition from the car stopped state 136 is the detection of the door open variable remaining false for a period of greater than 5 seconds after entering the car stopped state 136 The condition may be provided by the signal processor in response to an appropriate switch 38 being activated by the instructor or the student at the beginning or at some point during the exercise. This will result in a transition to an inoperative 4 (INOP4) state 150 as indicated by a transitional line 152. The signal processor may then select an appropriate look-up table in the ROM 50 and provide appropriate displays in response to the student touching a pair of test points 34 with probes 46, 48 wherein the test points correspond to, for example, the car gate lock contacts 153 indicated in Section 3 of FIG. 1.

The car door open state functionally represents the opening of the inner doors of the lift after the car has stopped at a floor. It represents the conclusion of a normal lift run. The normal transition from the car door open state occurs upon detection of the opening of the hoistway doors (the door switch variable represented by typical contacts 117 going false) which results in a transition to the car idle state 102. This represents a completed sequence of lift operation and will result in the beginning of the entire sequence again.

The abnormal transition condition from the car door open state 144 is for the door switch to remain true for a period of greater than 20 seconds after the state machine enters the car door open state 144 as indicated by a transitional line 154 to an inoperative 5 (INOP5) state 156. The represents the occurrence of a locked hoistway door or a failure of the lift doors to open for some other reason.

Referring back to the service state 114, such functionally represents the performance of some maintenance action upon a lift by a qualified repairman. The service variable achieves a true value when the service switch (NORMAL INSP. in FIG. 1 at numeral 7). The service variable achieves a true value when the service switch associated with the simulator is turned to an ON position. The detection of the occurrence of the service variable going true by the signal processor will cause a transition from the car idle state 102 to the service state 114, as previously described (the service state is also referred to in lift parlance as the "attendant" state). The normal transition from the attendant state is the detection of the service variable in the false condition as indicated by a transition line 158 back to the car idle state 102. This transition 158 represents the time when the student releases the switch indicating that he has performed his "maintenance action" on the "lift." At that time, the state machine sequences from the attendance state 114 to the car idle state 102 and begins again to simulate the operation of a normally operating lift.

Referring back to the INOP1 state, it will be recalled that upon detection of the power variable going false for greater than one second, the state machine transitions from the car idle state 102 to the inoperative 1 state 110. Appropriate signals and/or display information will be provided to the student from an associated look-up table in ROM 50. The normal transition condition from state 110 is the detection of the power variable going true as indicated by a transitional line 166. In this case, the state machine will sequence from state 110 back to the car idle state 102 and will resume operating the simulation of the lift come as normal as indicated by a transitional line 166.

The inoperative 2 state 122, previously discussed in connection with the transition line 124, functionally represents a failure of a hoistway door to close. It is exited upon detection of the Hoistway Door Lock going true with a transition back to the Car Idle State 102 as indicated by a transition line 170.

The inoperative 3 state 130, previously discussed in connection with transition line 132, functionally represents the failure of the brake to lift for the lift car within 15 seconds of the state machine entering the car ready state and the brake lift variable at the same time being false. A possible transition from the inoperative 3 state 130 is to the car door open state 144 which occurs when the door open variable is detected going true after entering the inoperative 3 state 130. This produces an immediate entrance to the car door open state 144 as indicated by a transitional line 190. A transition out of the inoperative 3 state 130 to the car active state 126 occurs if a brake lift is detected as being true after entering state 130 as indicated by a transitional line 194. Also, if a button Variable is false for greater than 5 seconds, as indicated by a transitional line 196, a transition is made to the car idle state 102.

The inoperative 4 state 150, previously discussed in connection with transition line 152, represents the condition of a door open variable going false, corresponding to a door open actuator failure. It is possible to transition from the inoperative 4 state 150 to the car door open state 144 upon detecting the door open variable going true as indicated by a transitional line 202. It is also possible to transition from the inoperative 4 state 150 to the car active state 126 upon detection of the brake lift variable going true as indicated by a transitional line 204. A transition to state 150 may indicate that the door open mechanism has "failed."

The inoperative 5 state 156 represents the failure of the hoistway door actuators to open. It is entered from the car door open state 144 if the hoistway doors do not "open" within 20 seconds after entering the car door open state 144. A transition from the inoperative 5 state 156 to the car idle state 102 occurs if the door switch variable goes false, as indicated by a transitional line 222.

The inoperative 6 state 140 functionally represents the stoppage of the lift car by an opening of the safety chain. Detection of the safety variable going true will result in an immediate transition to the car stopped state 136 as indicated by a transitional line 244.

The foregoing description of a state machine for a lift simulator is of course generally applicable to other systems including an injection molding simulator such as is shown in FIG. 3. Such will not be described in detail, as the same general principles of establishing normal states and simulated transitions to inoperative states apply there as well.

It should be understood that other models for use in designing the simulator program may be used as well. For example, a selected lift system will have an electrical control schematic diagram provided by the design engineers for installation and troubleshooting purposes. In such a diagram the various nodes may be defined according to various Boolean expressions which may be stored in the ROM 50. When all of the simulated condition signals are taken into account, one of the equations will be satisfied for each node. The satisfaction of a particular equation for a particular node will point to particular storage locations also in ROM 50 for quantitatively defining in terms of voltage or resistance, for example, the value of that node with respect to any number of other nodes.

Although the invention has been shown and described with respect to an exemplary embodiment thereof, it should be understood that the foregoing and other changes, omissions and additions may be made therein and thereto, without departing from the spirit and scope of the invention.

What is claimed is:

1. Apparatus, comprising:
   a plurality of switches, responsive to manual actuation, for providing simulated condition signals;
   a signal processor, responsive to said simulated condition signals, for providing an indicator signal for indicating said simulated conditions;
   indicator means, responsive to said indicator signal, for providing a visual indication of said simulated condition;
   said signal processor providing an interrogation signal;
   a test probe, responsive to said interrogation signal, for providing said interrogation signal to a selected one of
   a plurality of test points, for providing said interrogation signal from said selected test point;
   said signal processor being responsive to said interrogation signal from said selected test point for providing a display signals; and
   display means, responsive to said display signal for displaying a quantitative indication of said simulated condition;
   wherein said signal processor, in response to said simulated condition signals, provides transition signals indicative of transitions between simulated states and provides said indicator and display signals according to said transition signals; and
   wherein said simulated states comprise a closed loop of normal operating states from which transitions to abnormal operating states are made in response to said simulated condition signals.

2. The apparatus of claim 1, wherein said signal processor stores resident condition signals grouped in equations which predefine combinations of said resident signals in specified states for determining, in response to said simulated condition signals, the identity of grouped signals indicative of satisfied equations, for providing said indicator and display signals according to said satisfied group signals.

3. A lift simulator, comprising:
   portable mounting means having segregated areas on a surface thereof including hoistway and machine room, car, test meter and controller areas;
   said hoistway and machine room area having mounted therein hoistway and machine room test points responsive to a probe signal for providing a simulated test signal, hall call pushbuttons for providing a simulated hall call signal, telltale lamps responsive to hall telltale signals for displayed simulated conditions and car position display means responsive to car position display signals for displaying simulated car position;
   said car area having mounted therein car operating pushbuttons for providing a simulated car call signal, car door mimic means responsive to a car door mimic signal for mimicking a car door, car test points responsive to said probe signal for providing said simulated test signal, top of car inspection switches for providing an inspection signal and top of car telltale lamps responsive to top of car telltale signals for displaying simulated conditions;
   said test meter area having mounted therein a display responsive to a display signal and probes responsive to an interrogation signal for providing said interrogation signal as said probe signal;
   said controller area having mounted therein, relay simulating test points responsive to said probe signal for providing said simulated test signal and relay display means responsive to a relay indicator signal for indicating an energized relay; and
   signal processor means mounted in said mounting means for providing said interrogation signal, responsive to said simulated test signal from said hoistway and machine room, car and controller area test points for providing said display signal, responsive to said simulated hall call signal for providing said hall telltale signals, responsive to said simulated hall call signal and said simulated car call signal for providing said car position display signals, said car door mimic signal, said car door mimic signal and said relay indicator signal and responsive to said inspection signal for providing said top of car telltale signals.

* * * * *